United States Patent
Dunne

(10) Patent No.: US 6,282,803 B1
(45) Date of Patent: *Sep. 4, 2001

(54) SELF CALIBRATION CIRCUIT FOR DETERMINING AN ACCURATE ZERO COMPENSATION FOR A FLUXGATE COMPASS

(75) Inventor: Jeremy G. Dunne, Littleton, CO (US)

(73) Assignee: Laser Technology, Inc., Englewood, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,873

(22) Filed: Apr. 24, 1998

(51) Int. Cl.[7] .................................................. G01C 17/30
(52) U.S. Cl. ............................... 33/361; 33/356; 324/253
(58) Field of Search ............................ 33/356, 357, 361, 33/362; 324/247, 258, 244, 260, 253, 255

(56) References Cited

U.S. PATENT DOCUMENTS

| | | | |
|---|---|---|---|
| 3,888,201 | * | 6/1975 | Zuvela ..................................... 33/361 |
| 3,959,889 | * | 6/1976 | Thomas .................................... 33/361 |
| 4,262,427 | * | 4/1981 | Lynch et al. ............................ 33/361 |
| 4,495,467 | * | 1/1985 | Kuno et al. .............................. 33/361 |
| 4,622,754 | * | 11/1986 | Chujo et al. ........................... 33/361 |
| 4,929,899 | * | 5/1990 | Weixelman et al. .................... 33/361 |
| 5,010,653 | * | 4/1991 | Fowler .................................... 33/356 |
| 5,091,697 | * | 2/1992 | Roth et al. .............................. 33/361 |
| 5,161,311 | * | 11/1992 | Esmer et al. ............................ 33/361 |
| 5,199,178 | * | 4/1993 | Tong et al. .............................. 33/361 |
| 5,255,422 | * | 10/1993 | Schierbeek et al. .................... 33/361 |
| 5,652,512 | * | 7/1997 | Feintuch et al. ........................ 33/361 |

* cited by examiner

Primary Examiner—Andrew H. Hirshfeld
(74) Attorney, Agent, or Firm—William J. Kubida; Stuart T. Langley; Hogan & Hartson LLP

(57) ABSTRACT

A self calibrating zero compensation circuit for a fluxgate compass comprising a toroidal core; a drive winding coupled to said core, and at least one and preferably two secondary sensing windings coupled to said core comprises a continuously operating demodulator coupled to the sensing windings and an intermittently operated drive signal fed to the drive winding. A microprocessor is coupled to the demodulator output through an analog to digital converter. The microprocessor provides alternatingly to the drive winding a drive signal for a first period of time and prevents transmission of the drive signal for a second, preferably equal period of time. During the second period of time, the sensing windings and the demodulator provide an output signal to said microprocessor representing the zero signal reference. The demodulator output during the first period of time represents the magnetic field signal from the compass. The output signal during the second period of time is used by the microprocessor as a zero reference or base for processing the demodulated output signal during the first period of time to self correct for drift and internal changes within the compass sensor over time.

23 Claims, 5 Drawing Sheets

SELF CALIBRATION CIRCUIT FOR DETERMINING AN ACCURATE ZERO COMPENSATION FOR A FLUXGATE COMPASS

CROSS REFERENCE TO RELATED APPLICATIONS

This application is related to U.S. patent application Ser. No. 08/918,395, filed Aug. 26, 1997 and entitled Modularized Laser-Based Survey System which is hereby incorporated by reference herein in its entirety.

BACKGROUND OF THE INVENTION

1. Field of the Invention

The present invention relates, in general, to the field of electronics circuits for surveying instruments. More particularly, the present invention relates to a self compensation circuit for variations in reference levels for an electronic compass module in a laser based surveying instrument.

2. Description of the Related Art

A conventional laser based surveying apparatus developed and currently marketed by Laser Technologies, Inc. of Englewood, Colo. is the Criterion™ series of surveying instruments. The Criterion™ instrument includes, among other things, a laser transmitter and receiver, a microprocessor, a numeric keypad for data entry and instrument control commands, an internal fluxgate compass for bearing/azimuth measurement, a tilt angle sensor for inclination measurements, an aiming or spotting telescope mounted on the housing, a data collector, and serial port for data transfer. This instrument measures and computes heights, horizontal distances, vertical distances, slope distances, inclinations, coordinates, bearings or azimuths, and multiple point traverse survey data. The instrument may also be coupled to a global positioning system (GPS) receiver to pinpoint the location from which measurements are being taken.

A new modularized surveying instrument system has been developed which has all of the features of the Criterion instrument and overcomes some of the operational limitations of the Criterion instrument. This modular system uses a fluxgate compass sensor in a separable compass module. The modular fluxgate compass in a separate module can be held level while the other modules are moved as necessary to take requisite measurements.

The fluxgate compass sensor must periodically be "zeroed" or corrected for variations in the inherent physical characteristics of the sensor. This must be done periodically as the internal characteristics of the sensor change over a period of time and exposure to stray magnetic fields and other interference effects interfere with true readings. The corrections are typically manually implemented calibration steps utilizing a known reference heading.

The fluxgate compass is basically a toroidal electromagnet core driven by a drive winding coil. A pair of secondary windings coils are positioned at 90 degrees apart around the toroidal core. The basic principle utilized in the fluxgate compass is to compare the drive coil current needed to saturate the core in one direction as opposed to the opposite direction. The difference between the saturation currents is due to the external field (the earth's magnetic field). The excitation is provided by a drive coil which periodically saturates the core. Variations in the core flux due to external magnetic field effects are then detected via the induced voltage in the secondary sensing coils. Since the secondary coils are spaced apart 90 degrees, one coil output is the "X" axis component output and the other coil output is the "Y" axis component output. These outputs, when appropriately demodulated, are proportional to x and y components of the magnetic field sensed.

A commercially available fluxgate sensor is available through KVH Industries, of Middletown, R.I. Their technique is to take these secondary signals and convert them to a time value through an integrator approach and then determine the x and y components of the sensed magnetic field signal strength from an integrating converter. This approach is complex and requires a great deal of circuitry to accomplish. A simpler approach is needed to determine the direction and magnitude of an external magnetic field utilizing a fluxgate sensor.

In order to conventionally zero calibrate the KVH fluxgate compass instrument the instrument may be placed at a known location in a known orientation and then its accuracy corrected to this known location. The instrument must then be periodically re-calibrated in a similar manner to correct for zero drift of the electronics due to component aging and other long term effects. This process is time consuming and somewhat complex. Accordingly there is a need for an instrument which automatically compensates itself for sensor circuit drift and other long term effects.

SUMMARY OF THE INVENTION

The present invention is a fluxgate compass drive and sensing circuit which continuously and automatically compensates for internal sensor circuit characteristic drifts and external background effects without having to manually perform a compensation routine. Fluxgate compass self calibration in accordance with the present invention essentially involves using the output signal from the secondary coils of the two axis fluxgate magnetometer, when there is no primary coil drive signal present, as the zero reference signal level for the fluxgate magnetometer. This is accomplished by driving the primary or drive coil only part of the time and sensing secondary (x and y) signals 100% of the time. The output sensed when the drive coil is not being driven is then used automatically as the zero reference signal by the microprocessor for the next period in which the drive coil is driven. In this way, the fluxgate compass is continuously zero calibrated.

The zero calibration method in accordance with the present invention basically comprises the steps of 1) providing a plurality of sensing coils spaced around portions of a ferromagnetic toroidal core; 2) providing a drive coil positioned around the toroidal core operable to pass a drive signal from a microprocessor through the drive coil for a first period of time and a zero drive signal for a second period of time; 3) sensing a first sensor signal during said first period of time through each of said sensing coils; 4) sensing a second sensor signal from said sensing coils during said second period of time; and 5) using said second sensor signal as a zero reference signal in said microprocessor.

The self calibration drive circuit in accordance with the present invention for operating a fluxgate compass sensor via a microprocessor, wherein the fluxgate compass sensor has a toroidal core, a drive winding and at least two secondary sensing windings, comprises an oscillator connected to a first square wave generator operably connected to a frequency divider and to a plurality of anti-phase demodulator switches, the secondary sensing windings being connected to the anti-phase switches, the frequency divider being connected to the drive winding, wherein the microprocessor controls the frequency divider to provide a driver output signal to the drive winding during a first time period and a zero driver output signal during a second time period, the demodulator switches operably passing a first sensor signal during said first and second sensor signal during said second time periods to a microprocessor. The second sensor signal is then subtracted from the first sensor signal in the microprocessor so that the zero reference signal changes are automatically compensated for during each measurement.

An alternative preferred embodiment of the present invention also includes an automatic dual mode sensitivity control for the fluxgate compass core to compensate for operating changes which occur due to operation of the instrument in regions of reduced horizontal component such as with operation above the arctic circle. In these polar regions the horizontal component of the magnetic field is greatly reduced compared to the vertical or z component of the field.

This alternative embodiment also includes circuitry to compensate for the local environment of operation of the instrument, such as in an automotive vehicle. In this case the vehicle's metal will distort the magnetic readings and thus introduce an offset. The alternative embodiment senses this offset and introduces a compensating offset to negate the magnetic effects of the vehicle on the instrument.

This alternative embodiment also includes a dithering signal which is fed to the demodulation circuit to improve the accuracy of measurement transmitted to the microprocessor. Finally, this alternative embodiment also includes a two axis tilt angle sensor which alerts the user via a variable audible warbling tone when the base of the instrument is oriented out of a level plane.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE INVENTION

First Embodiment

Figure 1:
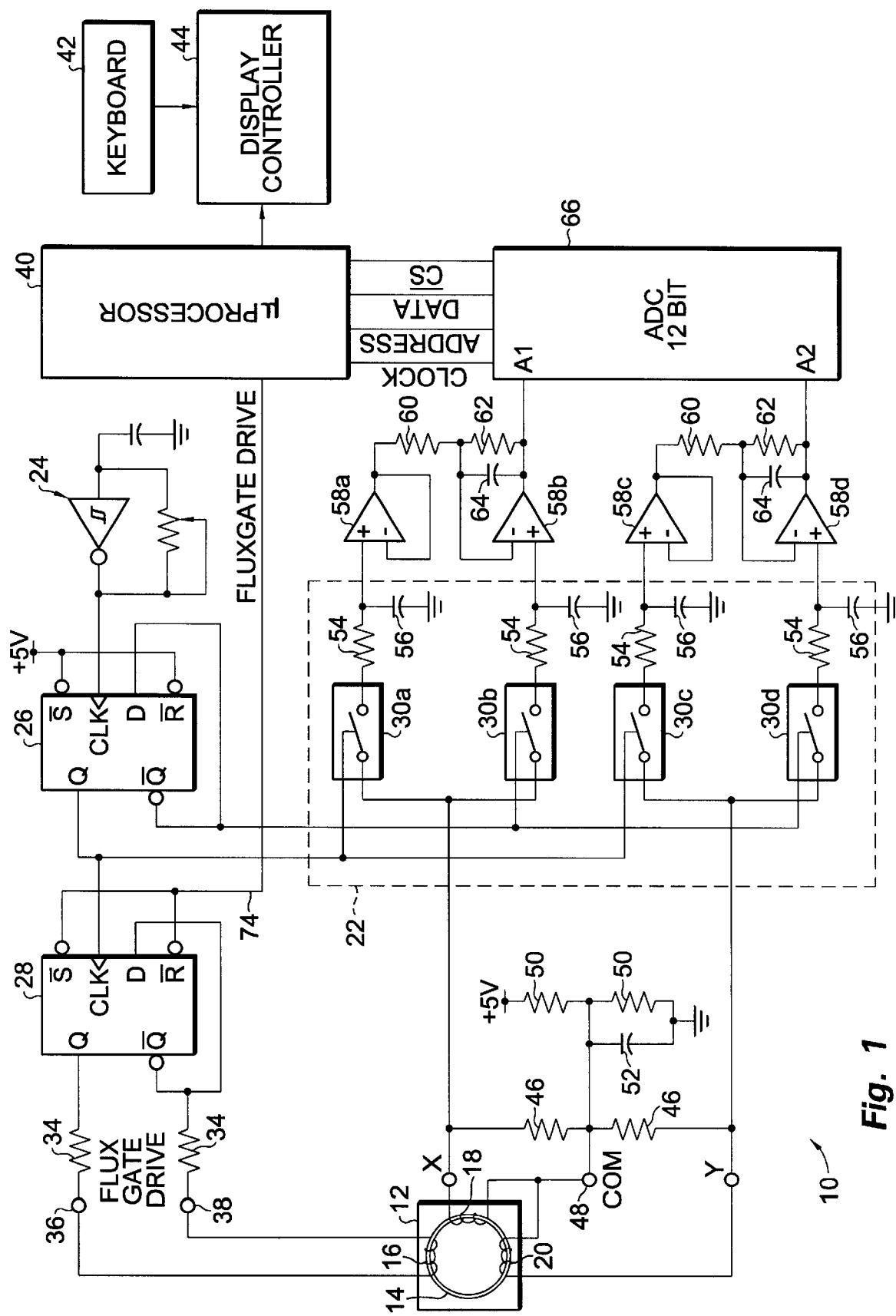
FIG. 1 is a schematic diagram of a circuit in accordance with present invention.

A first embodiment of the present invention is a self compensation circuit 10 for a fluxgate compass sensor 12, which is preferably a floating ring core fluxgate compass. For example, the first circuit 10 could be connected to a commercially available sensor 12, model SE 15, made by KVH Industries, Inc, of Middletown, R.I.

The sensor 12 has a floating core 14, a drive coil 16, and two secondary (x and y) coils 18 and 20 spaced 90 degrees apart about the core 14. The drive coil 16 forms a toroidal winding around the magnetic core 14. The drive current to the drive coil 16 drives the core in and out of saturation. The coils 18 and 20 pick up the coupled drive signal and a signal that's proportional to the external magnetic field. The circuit 10 then demodulates the composite signal in a demodulator 22 and generates a x component and a y component of the external magnetic field which can then be used to calculate the heading of the field or the direction of the field, relative field strength, and other such information.

Circuit 10 comprises a Schmitt trigger oscillator 24 which generates a frequency four times a range suitable for driving the compass sensor 12 such as about 90 kHz for the SE 15 series of sensors. Other frequencies may be used depending on the characteristics of the ring core compass sensor being used. The 90 kHz output of this oscillator 24 is connected to the clock input of one section of a dual D flip-flop operating as a square wave generator 26. The preset and clear terminals of this flip flop 26 are continuously held high at 5 volts. The flip flop 26 generates a precise square wave output having a precise 45 kHz frequency which is half the frequency of the oscillator 24.

A first output of the flip flop 26 is connected to the clock input of a frequency divider 28 and also to the first and third of four demodulator anti-phase switches 30a and 30c in the demodulator 22. A second, inverted output of the flip flop 26 is connected to the inputs of the other two of the four demodulator anti-phase switches 30b and 30d in the demodulator 22. This second, 45 kHz inverted output is also connected directly back to the data input of the flip flop 26. The output frequency of the flip flop 26 is precisely half the output frequency of the oscillator 24, and thus, in this preferred embodiment, is about 45 kHz.

The frequency divider 28 performs precisely the same function as flip flop 26. That is, divider 28 produces a precise square wave train at half the frequency of flip flop 26, or 22.5 kHz. The divider 28 is formed from the second half of the dual D flip flop. Its first output is connected through a resistor 34 to one terminal 36 of the drive coil 16. The second, inverse, output of the frequency divider 28 is connected through another resistor 34 to the other terminal 38 of the drive coil 16. Thus the drive coil 16 is driven by a precise 50% duty cycle 22.5 kHz signal. The second, inverse output of divider 28 is also connected back to the data input of the divider 28. The set and reset terminals of the divider 28 are connected to a flux drive output control line from the microprocessor 40. Thus the microprocessor 40 controls the output operation of the frequency divider 28 and thus controls the on/off energization of the drive coil 16. When a control high signal is sent from the microprocessor 40 via the fluxgate drive control line, to the frequency divider 28, the frequency divider 28 produces and sends a precise square wave drive signal with precise 50% duty cycle at one quarter the frequency of the oscillator 24 to the drive coil 16. When a control low signal is sent from the microprocessor 40, the output of the divider 28 is cut off.

A keyboard 42 is connected to a display controller 44 and to a display device (not shown) in a conventional manner. The display controller 44 is connected to and provides operational control to the microprocessor 40 via the keyboard 42.

The secondary or sensing portion of the circuit 10 is continuously operating, in contrast to the fluxgate drive circuit, which is intermittent, as pointed out above. The secondary of the sensor 12 comprises a pair of windings 18 and 20 oriented 90° apart on the core 14. The x coil winding 18 has one end connected to the input terminals of anti-phase switches 30a and 30b and to one end of a pair of series connected resistors 46. The other end of the x coil winding 18 is connected to one end of the y coil winding 20 and to a common terminal 48 which is also connected between the pair of resistors 46. The other end of the y coil winding 20 is connected to the other end of the series connected resistors 46 and to the inputs of anti-phase switches 30c and 30d.

The common point 48 is also connected to the midpoint between a pair of series connected voltage divider resistors 50. One of the other ends of the resistors 50 is connected to a +5 volt source and the other end of the other resistor 50 is connected to ground. A capacitor 52 is also connected between common point 48 and ground.

The output terminal of each of the anti-phase switches 30a–d is connected to one end of to a resistor 54. The other end of the resistor 54 is connected to one end of a capacitor 56 whose other end is connected to ground. This other end of the resistor 54, and the one end of the capacitor 56 are also connected to the positive input of an operational amplifier 58. The resistor 54 and capacitor 56 act as a filter for the anti-phase demodulator switch 30.

The filtered outputs of anti-phase switches 30a and 30b, representing the x winding 18 signals, are fed to the positive inputs of operational amplifiers 58a and 58b. Similarly, the filtered outputs of anti-phase switches 30c and 30d, representing the y winding 20 signals, are fed to the positive inputs of operational amplifiers 58c and 58d. The output of amplifier 58a is connected back to the negative input of the amplifier 58a and is also connected to one end of a resistor 60. The output of amplifier 58b is connected to one end of a resistor 62 and one side of a capacitor 64. The other side of the capacitor 64 is connected to the other ends of resistors 60 and 62 and back to the negative input of the operational amplifier 58b. Thus the output of amplifier 58a is effectively connected to the negative input of the amplifier 58b and thus the combination of the amplifiers 58a and 58b acts as a differential amplifier circuit, amplifying the difference between the positive going secondary x signal and the negative going x signal. The output of the amplifier 58b is also connected to the A1 input terminal of a 12 bit analog to digital converter (ADC) 66.

The filtered outputs of anti-phase switches 30c and 30d, representing the y winding 20 signals, are similarly fed to the positive inputs of operational amplifiers 58c and 58d. The output of amplifier 58c is connected back to the negative input of the amplifier 58c and is also connected to one end of a resistor 60. The output of amplifier 58d is connected to one end of a resistor 62 and one side of a capacitor 64. The other side of the capacitor 64 is connected to the other ends of resistors 60 and 62 and back to the negative input of the operational amplifier 58d. Thus the output of amplifier 58c is effectively connected to the negative input of the amplifier 58d and thus the combination of the amplifiers 58c and 58d acts as a differential amplifier circuit, amplifying the difference between the positive going secondary y signal and the negative going x signal. The output of the amplifier 58d is also connected to the A2 input terminal of the 12 bit ADC 66.

The positive going output of the square wave generator 26, which is twice the frequency of the square wave drive signal going to drive coil 16, is fed to the control input of anti-phase switches 30a and 30c. At the same time, the inverse output of the square wave generator 26 is fed to the control input of anti-phase switches 30b and 30d. Thus the sampling of the x and y output components each at twice the input frequency effectively detects and amplifies the second harmonic of the coupled signal from the drive coil 16 into the secondary coils 18 and 20. Thus the demodulator 22 samples the x second harmonic negative component relative to common through anti-phase switch 30b and the x second harmonic positive component relative to common through anti-phase switch 30a. The two demodulated outputs are then amplified, and their difference fed to the ADC 66.

In the preferred embodiment shown in FIG. 1, a 12 bit ADC is utilized. A larger bit ADC could also be used, but 12 is sufficient to achieve tenth degree resolution. The output data from the ADC 66 is then fed to the microprocessor 40.

Figure 2:
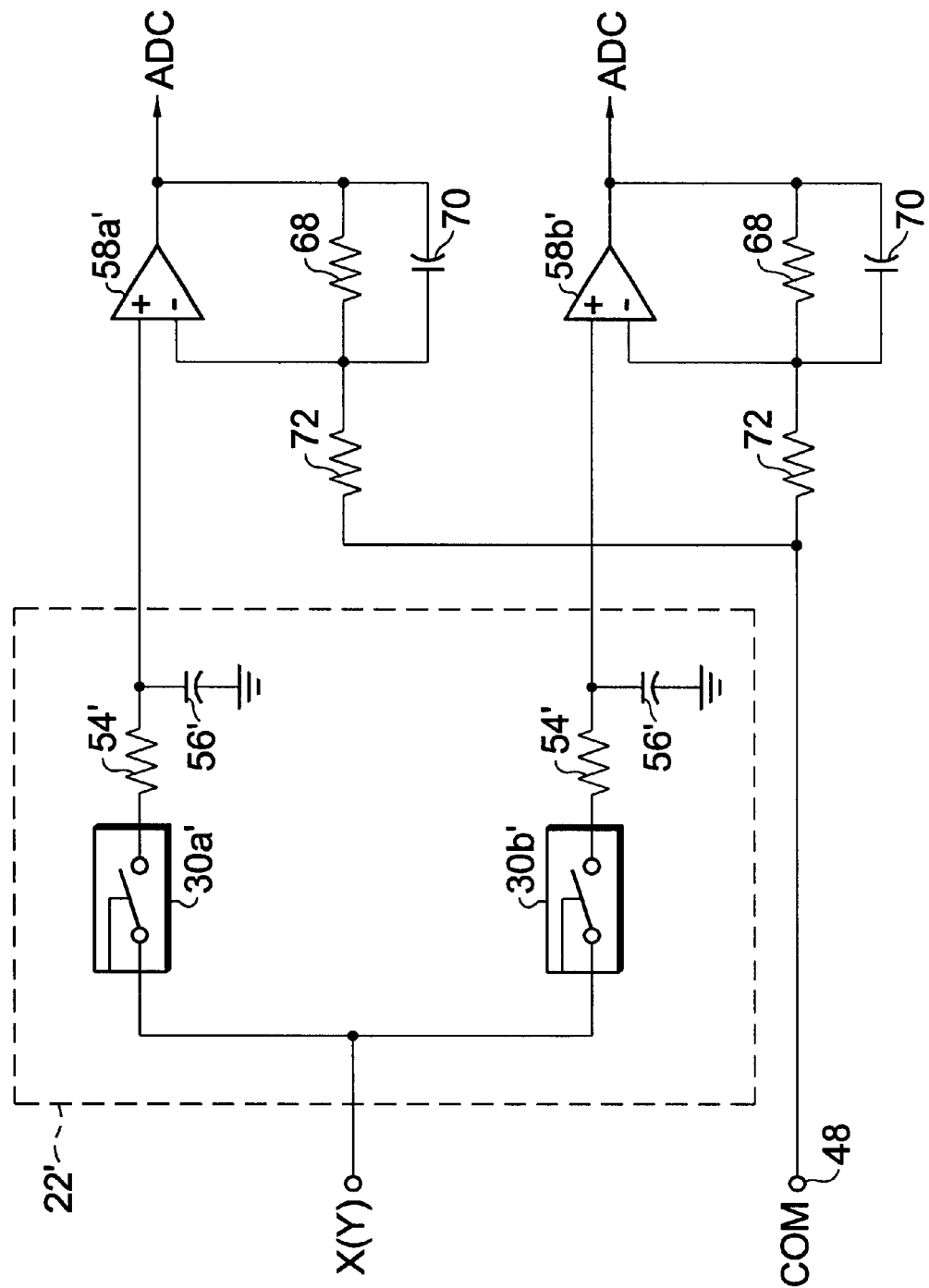
FIG. 2 is a schematic diagram of an alternative demodulation and amplification portion of the circuit of FIG. 1.

An alternative demodulation scheme for the self compensation circuit of the invention is shown in FIG. 2. In this alternative scheme, as is the case in FIG. 1, the x winding and y winding demodulators 22' are preferably identical and thus only one is shown, with the other being indicated in parenthesis. Each x or y demodulator 22' includes two anti-phase demodulator switches 30a',b' and output filters comprising resistors 54' and capacitors 56' as in the first embodiment. The outputs of the switches 30a',b' are each fed through resistors 54' to the positive inputs of the operational amplifiers 58a' and 58b'. The output of each amplifier is then fed directly to an input to the ADC 66. In addition, the output of each amplifier is connected through a resistor 68 in parallel with a capacitor 70 back to the negative input of the amplifies 58a' and 58b'. The negative input of the amplifiers 58a' and 58b' is also connected to a resistor 72 which is in turn connected to the common terminal 48.

In this alternative, the difference lies in the amplifier scheme. Rather than taking and amplifying the difference between the negative and positive second harmonic signal components as in the first embodiment shown in FIG. 1, here the second harmonic components are amplified relative to the common signal to generate two signals which affect the ADC 66 for each of the x and y windings. One positive signal and one negative signal relative to a common voltage signal are fed to the ADC in this alternative case for each of the x and y secondary components. Thus four inputs to the ADC 66 are used versus two in the embodiment shown in FIG. 1.

Common in the circuits shown in the Figures and described is relative, since in this embodiment a 0–5 volt rail is used. Obviously, a plus or minus 5 volt rail or any other voltage rail could be alternatively be used. For convenience, since the logic runs 0–5 volts, in the preferred embodiment shown in FIG. 1, a plus 5 volt rail is used and the common is just arbitrarily set at 2.5 volts at the center point, that way you optimize the use of the ADC 66. The ADC 66 is set so that its input range is 0–5 volts as well.

The output amplifiers 58', 58a' and 58b' are designed to swing rail to rail so you can utilize the full range of the analog to digital converter with a single 5 volt rail. Thus the alternative shown in FIG. 2 is an alternative to the demodulating scheme where you generate plus or minus voltage relative to common. This effectively gives you two times resolution with the scheme of FIG. 2. In this scheme if you swing between plus or minus a 1,000 counts off the center it has to stay within the linear range of the ADC. Max range would be plus or minus 2047, 2048, 2047 etc. For example, if the 58a circuit was giving plus a thousand, the 58a' would give plus a thousand and the 58b' would give minus a thousand relative to center and a total difference of two thousand counts. Thus this alternative provides two times the resolution of that of the first embodiment shown in FIG. 1 at the expense of slightly greater circuit complexity.

Referring now back to FIG. 1, a control line 74 called Fluxgate Drive comes from the microprocessor to the set and reset terminals of the frequency divider 28. This signal turns on and off the drive signal to the fluxgate core 14 via drive winding 16. Preferably, during operation, the drive signal is supplied so that drive winding 16 is on 50% of the time and off 50% of the time. However, the demodulator 22, square wave generator 26, and amplifiers 58 are left running continuously. When the fluxgate drive signal is low, the output of the ADC 66 to the microprocessor 40 represents a zero reference signal determination for the fluxgate sensor 12. By turning off the drive to the core 14 then there is no second harmonic signal from the drive winding 16 into the secondary windings 18 and 20. A reading in the ADC for this state is a zero field coming into the demodulator 22. The difference between this base reading and a reading taken when the drive winding 16 is powered is a zero compensation reading. The advantage of the circuit operation in accordance with the invention is that, for example, the anti-phase switches present a certain precharge into the filter comprising resistor 54 and capacitor 56 that differs slightly from the common voltage. This difference is an offset from zero. In addition, operational amplifier offsets create additional errors on top of the precharge. By taking the low ADC output with zero fluxgate drive input as the baseline or zero reference signal used by the microprocessor in evaluating the signal from the ADC, automatic compensation for zero offset and changes over time is accomplished. This circuit automatically compensates for sensor drift with time, temperature, etc. By alternately turning the drive off and on while reading the ADC channels on and averaging several readings, the running average becomes the reference point.

In the embodiment shown in FIG. 1, the oscillator 24 is preferably one gate of a 74HC14 Schmitt trigger package device set to operate at 90 kHz. The square wave generating flip flop 26 and frequency divider 28 are portions of a 74HC74-SO flip flop device. The anti-phase switches 30a, b,c,d are portions of a 4066 package device. The ADC 66 is a TLC2543-PLCC 12 bit device and the microprocessor is an 87C51FB-PLCC device. Fluxgate drive resistors 34 are typically 100Ω in the circuit shown in FIG. 1. Filter resistors 54 are typically 10 KΩ, resistors 60 and 62 are 10 KΩ and 100 KΩ respectively. Load resistors 46 and divider resistors 50 are typically 1 KΩ and 2 KΩ respectively. Capacitor 56 are typically 0.1 $\mu$f and capacitors 64 are 10 nf.

Alternative or Second Embodiment

Figure 3:
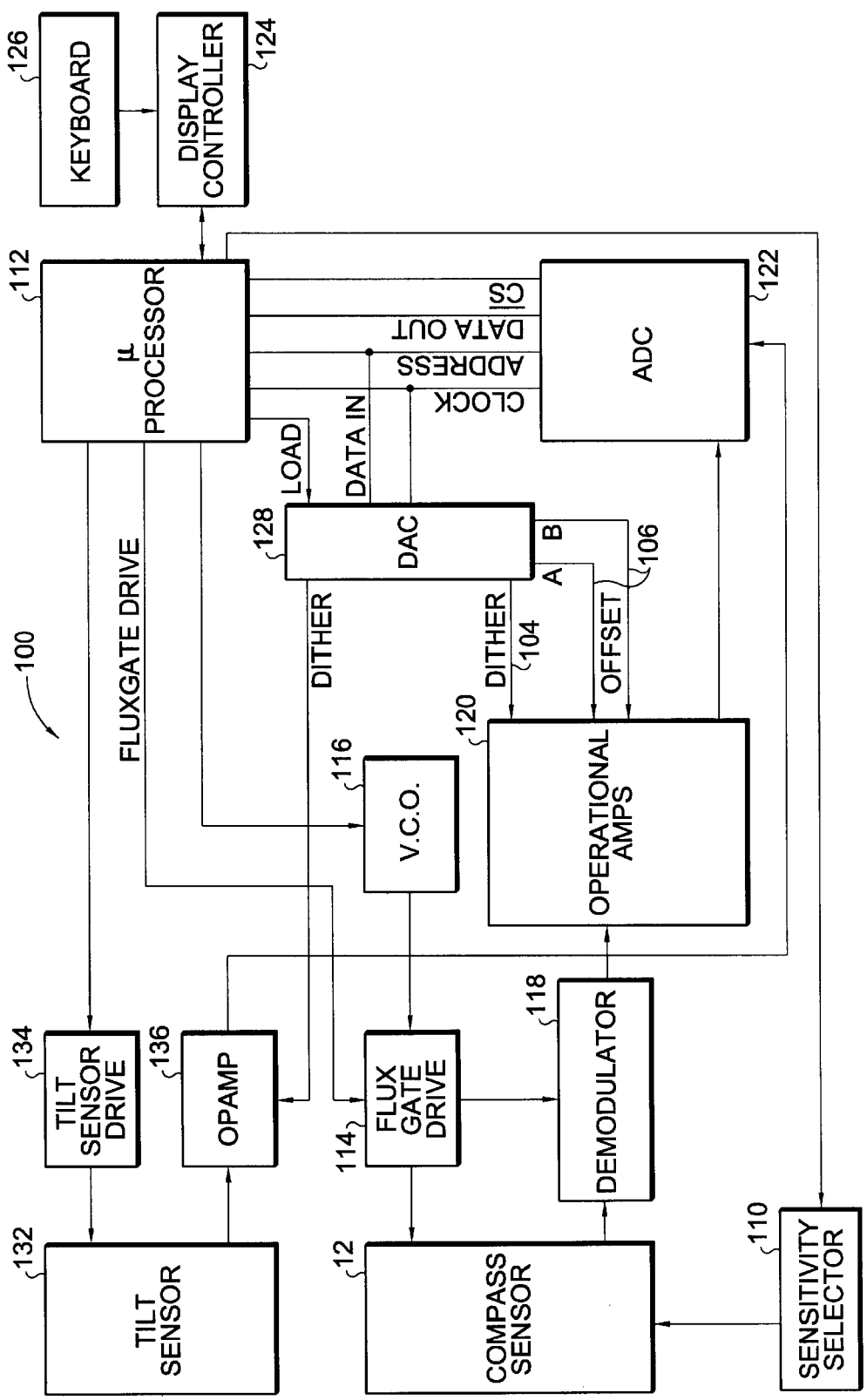
FIG. 3 is a block diagram of another alternative embodiment of a circuit in accordance with present invention.
Figure 4A:
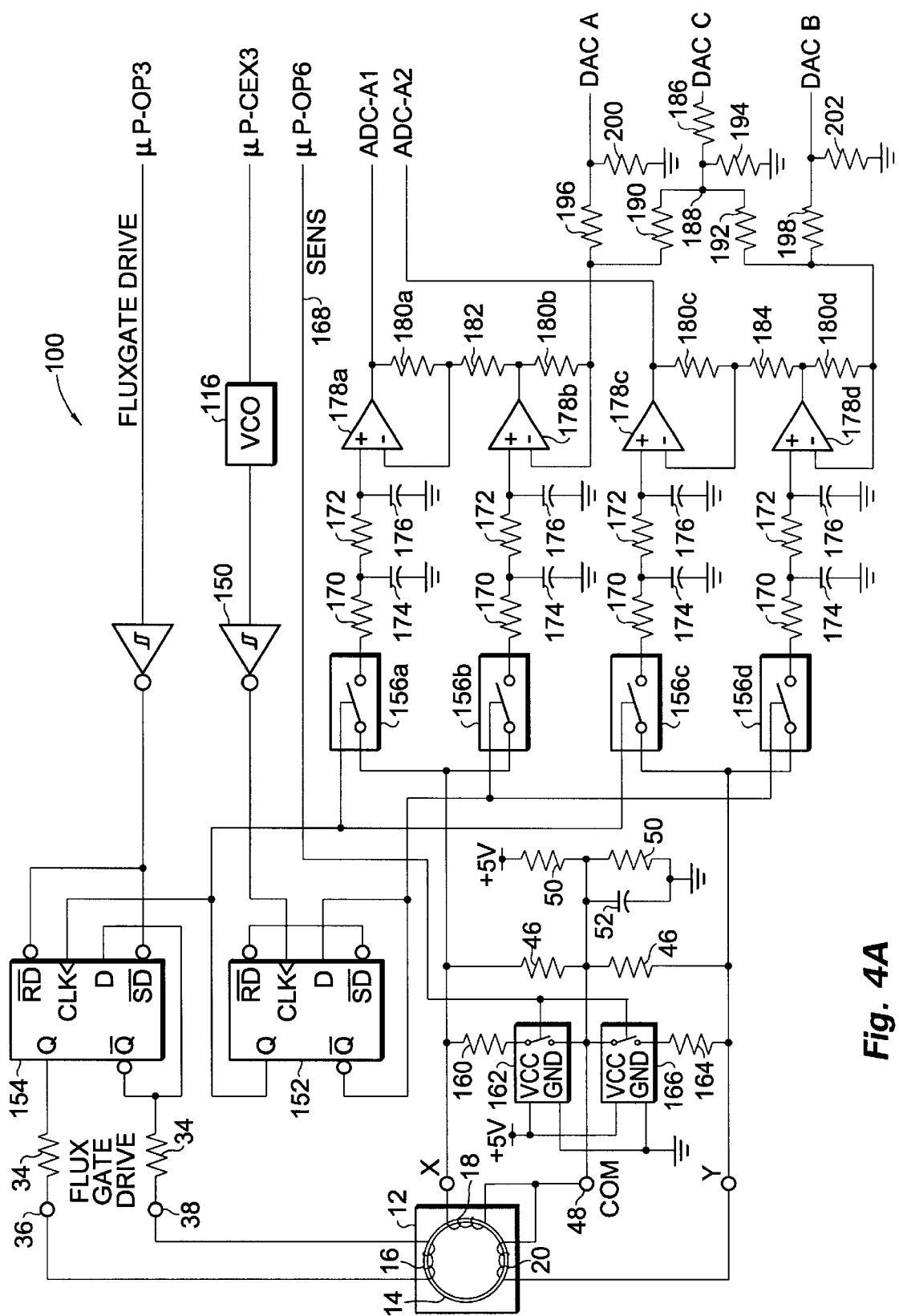
FIGS. 4A, 4B are a schematic diagram of the alternative embodiment of the circuit of the present invention shown in FIG. 3.
Figure 4B:
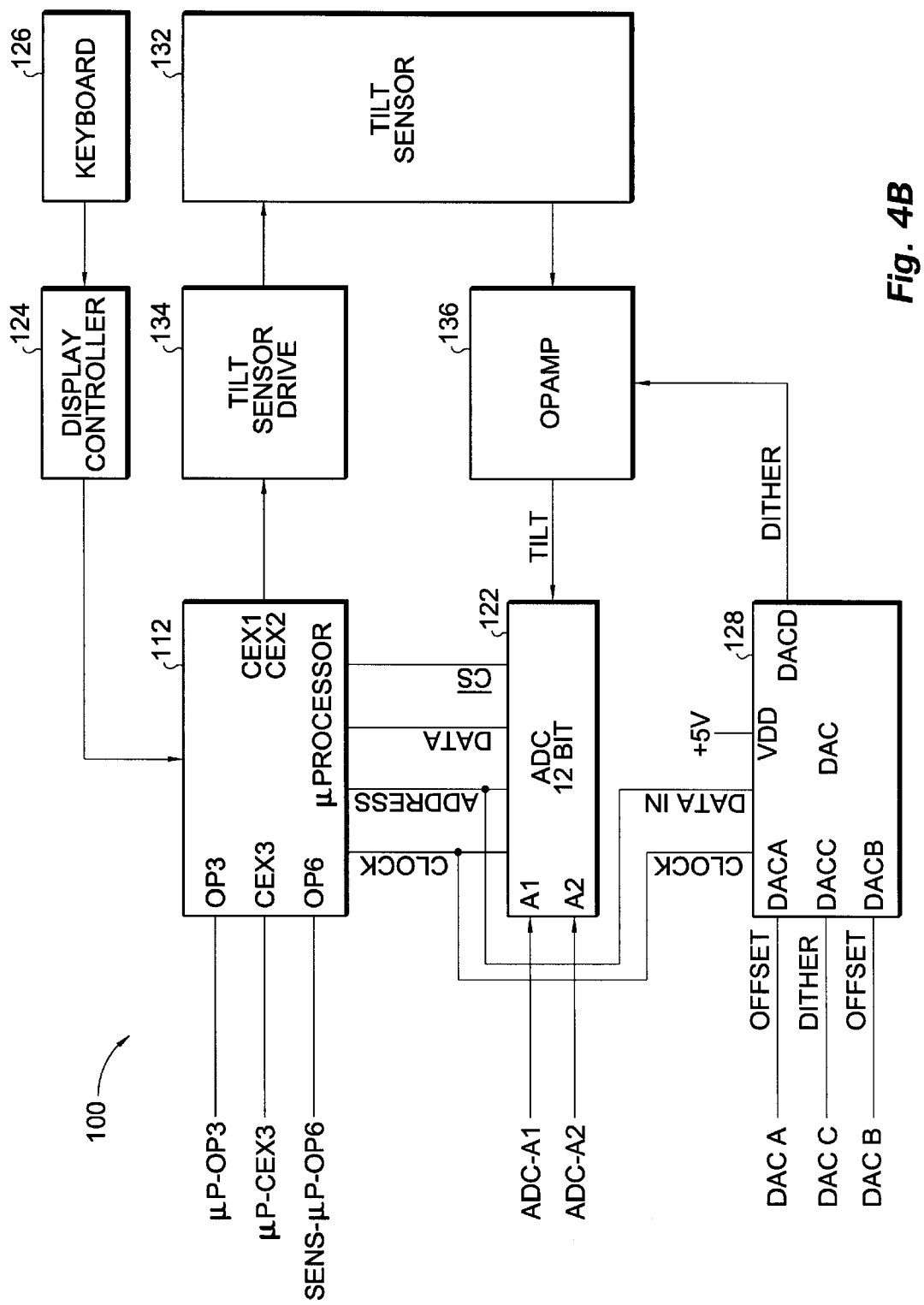

Referring now to FIGS. 3, 4A, and 4B, another preferred embodiment 100 of the invention is shown in block diagram and simplified schematic forms respectively. As shown in FIG. 3, this alternative embodiment 100 includes a dual mode compass sensor sensitivity compensation circuit 110, a digital to analog dithering function signal 104 in order to increase accuracy between digital steps and an offset correction function signal 106 to account for nearby uniform background shifts which can arise, for example, when the distance measuring instrument is located within an automotive vehicle.

Circuit 100 is coupled to a fluxgate compass sensor 12 which has a floating core 14, a drive coil 16 and two secondary (x,y) coils 18 and 20 spaced 90 degrees apart about the core 14. As previously described with reference to the first embodiment, the drive coil 16 forms a toroidal winding around the magnetic core 14. The current to the drive coil 16 drives the core 14 into and out of saturation. The coils 18 and 20 pick up the coupled drive signal and a signal that is proportional to the external magnetic field. The circuit 100 then demodulates the composite signal in a demodulator 118 and generates an x component and a y component of the external magnetic field which can then be used to calculate the heading of the field or the direction of the field, relative field strength, and other such information.

There are several refinements in this alternative embodiment 100 which enhance the zero compensation achievable over the first embodiment shown in FIG. 1. For example, fluxgate compasses work exceedingly well when the location on the earth's surface is below the Arctic Circle or north of Terra Del Fuego. Outside these latitudes, i.e., close to one of the poles, the horizontal component of the magnetic bearing signal is quite weak compared to the z component. Consequently, the achievable accuracy may be compromised. The alternative embodiment 100 addresses this problem. It includes an automatic dual range sensitivity selector circuit 110 which is controlled by the central microprocessor 112 which automatically increases coupled component sensitivity in order to compensate for this phenomenon.

The fluxgate compass coil 16 is driven by a fluxgate drive circuit 114 which provides a precise 50% duty cycle square wave at an operating frequency optimized for the particular fluxgate sensor 12. In the preferred embodiment shown, this frequency is preferably a precise 22.5 kHz signal generated in the fluxgate drive circuit 114 which has, as one input, a voltage controlled oscillator 116, which is in turn controlled by the microprocessor 112. The fluxgate drive circuit 114 also provides an exact double frequency, 45 kHz square wave signal to a demodulator circuit 118. The output of the compass x and y coils is fed also to the demodulator circuit 118 which removes the coupled signal component from the drive coil 16 from the output signal for each of the x and y components. The demodulated x and y component signals are then differentially amplified in operational amplifiers 120 and then sent to an analog to digital converter (ADC) 122. The ADC 122 then sends the digitized x and y components of the bearing signal to the microprocessor 112 for calculation of the bearing or direction. The resultant bearing is then displayed via display controller 124. An input keyboard or keypad 126 is used as in the first embodiment 10 to provide manual input to the microprocessor 112 such as operational mode selections and calibration mode values and other information required for calibration of the instrument.

During calibration of the instrument, the user typically moves the instrument in a circle, taking measurements at predetermined positions around the circle, such as every 45 degrees. Identification of which position is being measured during calibration is generally communicated to the microprocessor 112 via the keyboard 126. If the user is standing in the open, he/she simply turns around taking at least eight readings, one every 45 degrees. However, if the user is sitting in a motor vehicle, the user drives in a circle doing the same thing every 45 degrees. In this instance, the metal of the vehicle is going to provide a constant shift or offset to the readings taken, depending on the instrument location within the vehicle. The alternative embodiment 100 automatically compensates for this phenomenon. This constant shift is sensed during the calibration sequence by the microprocessor 112 and an offset signal is provided by the microprocessor 112 through a digital to analog converter 128 to the output of the operational amplifiers 120 to correct for this effect. The result is a true bearing reading irrespective of the vehicle presence after calibration of the instrument inside the vehicle.

Another feature of this alternative embodiment 100 is provided by the DAC 128. A dithering function signal 104 is provided to the operational amplifiers 120 to provide increased accuracy between the digital steps.

Another feature of this alternative embodiment 100 is the provision of an automatic dual mode detector sensitivity circuit 110 coupled between the sensor x and y output windings 18 and 20 and the demodulator circuit 118. This dual mode sensitivity circuit 110 is automatically triggered under software control by the microprocessor 112 when the x component measured falls below a predetermined value.

When this occurs, the microprocessor sends a signal to the circuit 110 to effectively increase the sensitivity of the x output winding.

Finally, the alternative embodiment 100 includes a two axis tilt sensor 132 which is driven by a tilt sensor drive circuit 134 which is controlled by the microprocessor 112. The sensor 132 provides a warble tone which is audible to the user and which indicates a progressive warning to the user as the platform of the instrument shifts off of a horizontal plane. The DAC 128 also provides a dither signal to the output amplifier 136 for the tilt sensor 132 to improve the accuracy of the sensor output to the microprocessor 112.

Referring now to FIGS. 4A and 4B, the circuit 100 is shown connected to a commercially available fluxgate compass sensor 12, model SE 25, made by KVH Industries, Inc, of Middletown, R.I. The sensor 12 has a floating core 14, a drive coil 16, and two secondary (xy) coils 18 and 20 spaced 90 degrees apart about the core 14. The drive coil 16 forms a toroidal winding around the magnetic core 14. The drive current to the drive coil 16 drives the core in and out of saturation. The coils 18 and 20 pick up the coupled drive signal and a signal that's proportional to the external magnetic field.

The flux gate drive circuit 114, comprising inverter 150, square wave generator 152, and frequency divider 154, is fed by a voltage controlled oscillator 116 and also receives a flux gate drive control signal from the microprocessor 112. The voltage controlled oscillator (VCO) 116 has a frequency output of about 90 kHz which is four times the frequency needed for operation of the compass sensor 12. The VCO 116 is connected via a Schmitt trigger 150 to the clock input of a precise square wave generator 152 which is one section of a dual D flip-flop. The preset and clear terminals of this square wave generator 152 are continuously held high at 5 volts. The square wave generator 152 generates a square wave output having a precise 45 kHz frequency which is half the frequency of the VCO 116.

A first output of the square wave generator 152 is connected to the clock input of a frequency divider 154 formed from the second section of the dual D flip-flop and also to the first and third of four demodulator anti-phase switches 156a and 156c in the demodulator 118. A second, inverted output of the square wave generator 152 is connected to the inputs of the other two of the four demodulator anti-phase switches 156b and 156d in the demodulator 118. This second, 45 kHz inverted output is also connected directly back to the data input of the square wave generator 152. The frequency divider 154 performs precisely the same function as generator 152. That is, divider 154 produces a precise square wave train at half the frequency of generator 152, or 22.5 kHz.

The divider 154 has its first output connected through a resistor 34 to one terminal 36 of the drive coil 16. The second, inverse, output of the frequency divider 154 is connected through another resistor 34 to the other terminal 38 of the drive coil 16. Thus the drive coil 16 is driven by a precise 50% duty cycle 22.5 kHz signal.

The second, inverse output of divider 154 is also connected back to the data input of the divider 154. The set and reset terminals of the divider 154 are connected to a fluxgate drive output control line from the microprocessor 112. Thus the microprocessor 112 controls the output operation of the frequency divider 154 and thus controls the on/off energization of the drive coil 16. When a control high signal is sent from the microprocessor 112 via the fluxgate drive control line, to the frequency divider 154, the frequency divider 154 produces and sends a precise square wave drive signal with precise 50% duty cycle at one quarter the frequency of the VCO 116 to the drive coil 16. When a control low signal is sent from the microprocessor 112, the output of the divider 154 is cut off.

A keyboard or keypad 126 is connected to a display controller 124 and to a display device (not shown) in a conventional manner as in the first embodiment discussed previously. The display controller 124 is connected to and provides operational control to the microprocessor 112 via the keyboard 126.

The secondary or sensing portion comprising demodulator 118, operational amplifiers 120, DAC 128, ADC 122, and the dual range sensitivity circuit 110 of the circuit 100 are continuously operating, in contrast to the fluxgate drive circuit 114, just described, which is intermittent. The secondary of the sensor 12 comprised of a pair of x and y windings 18 and 20 oriented 90° apart on the core 14. The x coil winding 18 has one end connected to the input terminals of anti-phase switches 156a and 156b and to one end of a pair of series connected resistors 46. The other end of the x coil winding 18 is connected to one end of the y coil winding 20 and to a common terminal 48 which is also connected between the pair of resistors 46 and one end of a resistor 160. The other end of the y coil winding 20 is connected to the other end of the series connected resistors 46 and to the inputs of anti-phase switches 156c and 156d.

The common point 48 is also connected to the midpoint between a pair of series connected voltage divider resistors 50. One of the other ends of the resistors 50 is connected to a +5 volt source and the other end of the other resistor 50 is connected to ground. A capacitor 52 is also connected between common point 48 and ground.

The dual mode sensitivity circuit 110 is positioned between the x and y terminals and the resistors 46. In essence, the circuit 110 simply places a resistor in parallel with each resistor 46 to decrease the sensitivity. Specifically, the x terminal of the secondary winding 18 is connected to one end of a resistor 160 which is in turn connected to one side of a digital switch 162. The other side of the digital switch 162 is connected to the common terminal 48. The y terminal 20 is also connected to one end of another resistor 164 which is in turn connected to one side of a switch 166. The other side of the switch 166 is connected to the common terminal 48. A control line 168 from the microprocessor 112 is connected to each of the switches 162 and 166 to selectively place resistors 160 and 164 in parallel with resistors 46 in order to change the sensitivity mode of the compass between high sensitivity and low sensitivity modes.

A low signal from the microprocessor 112 on the control line 168 occurs when the x component signal to the microcomputer 112 falls below a predetermined value. When this occurs, both switches 162 and 166 open, removing resistors 160 and 164 from being in parallel with resistors 50 thus automatically changing the sensitivity from low to high sensitivity mode. Conversely, when the x component exceeds another predetermined value the microprocessor 112 asserts a high on line 168, the switches 162 and 166 close, inserting resistors 160 and 164 into the secondary circuit and reverting the compass to low or normal sensitivity mode.

The demodulator block 118 comprises anti-phase switches 156a–d and a pair of filters in series with each of the switches made up of resistors 170 and 172 and capacitors 174 and 176. The output terminal of each of the anti-phase switches 156a–d is connected to one end of to a resistor 170 then to a capacitor 174 which is connected to ground. The other end of the resistor 170 and of the capacitor 174 are connected to one end of resistor 172. The other end of the resistor 172 is connected to the positive input of one of the operational amplifiers 178a–d and one side of capacitor 176. The resistor and capacitor pairs act as a two stage input filter into the operational amplifier block 120. The use of a two stage filter improves the clock rejection.

Operational amplifier block 120 comprises operational amplifiers 178a–d and output resistor networks described below. The filtered outputs of anti-phase switches 156a and 156b, representing the x winding 18 signals, are fed to the positive inputs of operational amplifiers 178a and 178b. Similarly, the filtered outputs of anti-phase switches 156c and 156d, representing the y winding 20 signals, are fed to the positive inputs of operational amplifiers 178c and 178d. The output of amplifier 178a is connected back to the negative input of the amplifier 178a through resistor 180a and is also connected directly to input A1 of the ADC 122. The output of amplifier 178b is connected back to the negative input of the amplifier 178b through resistor 180b and is also connected to the negative input of amplifier 178a through resistor 182. Thus the output of amplifier 178b is effectively connected to the negative input of the amplifier 178a and thus the combination of the amplifiers 178a and 178b acts as a differential amplifier circuit, amplifying the difference between the positive going secondary x signal and the negative going x signal. This difference output of amplifier 178a provides the x component signal directly to the A1 input terminal of the 12 bit ADC 122.

The filtered outputs of anti-phase switches 156c and 156d, representing the y winding 20 positive and negative signals, are similarly fed to the positive inputs of operational amplifiers 178c and 178d. The output of amplifier 178d is connected back to the negative input of the amplifier 178c through a resistor 184 and is also connected to one end of a resistor 180d which is in turn connected back to the negative input of amplifier 178d. The output of amplifier 178c is connected directly to terminal A2 of the ADC 122 and to one end of a resistor 180c which is in turn connected back to the negative input of amplifier 178c. Thus the output of amplifier 178d is effectively connected to the negative input of the amplifier 178c and thus the combination of the amplifiers 178c and 178d acts as a differential amplifier circuit, amplifying the difference between the positive going secondary y signal and the negative going y signal. This difference output of amplifier 178c provides the y component signal directly to the A2 input terminal of the 12 bit ADC 122.

The positive going output of the square wave generator 152, which is twice the frequency (45 kHz) of the square wave drive signal going to drive coil 16 (22.5 kHz), is fed to the control input of anti-phase switches 156a and 156c. At the same time, the inverse output of the square wave generator 152 is fed to the control input of anti-phase switches 156b and 156d. Thus the sampling of the x and y output components each at twice the input frequency effectively detects and amplifies the second harmonic of the coupled signal from the drive 16 into the secondary coils 18 and 20. Thus the demodulator 118 samples the x second harmonic negative component relative to common through anti-phase switch 156b and the x second harmonic positive component relative to common through anti-phase switch 156a. The two demodulated outputs are then amplified, and their difference fed to the ADC 122. The output data from the ADC 122 is then fed to the microprocessor 112.

Common in the circuits shown in the Figures and described is relative, as in the first embodiment since in this second alternative embodiment a 0–5 volt rail is used. Obviously, a plus or minus 5 volt rail or any other voltage rail could be alternatively be used. For convenience, since the logic runs 0–5 volts, in the preferred embodiment shown in FIG. 4, a plus 5 volt rail is used and the common is just arbitrarily set at 2.5 volts at the center point, that way you optimize the use of the ADC 122. The ADC 122 is set so that its input range is 0–5 volts as well.

As in the first embodiment, a control line called Fluxgate Drive comes from the microprocessor 112 to the set and reset terminals of the frequency divider 154. This signal turns on and off the drive to the fluxgate core 14 via winding 16. Preferably, during operation, the drive signal is supplied so that drive winding 16 is on 50% of the time and off 50% of the time. However, the square wave generator 152, demodulator 118, and amplifiers 178 are left running continuously. When the fluxgate drive signal is low, the output of the ADC 122 to the microprocessor 112 represents a zero reference signal determination for the fluxgate sensor 12. By turning off the drive to the core 14 then there is no second harmonic signal from the drive winding 16 into the secondary windings 18 and 20. A reading in the ADC 122 for this state is a zero field coming into the demodulator 118. The difference between this base or zero reference signal reading and a reading taken when the drive winding 16 is powered is a zero compensation reading. The advantage of the circuit operation in accordance with the invention is that, for example, the anti-phase switches present a certain precharge into the two stage filter network comprising resistors 170 and 174 and capacitors 172 and 176 that differs slightly from the common voltage. This difference is an offset from zero due to component aging, etc. In addition, operational amplifier offsets create additional errors on top of the precharge. By taking the zero ADC output with zero fluxgate drive input as the baseline reference used by the microprocessor 112 in evaluating the signal from the ADC 122, automatic compensation for zero offset changes over time is accomplished. This circuit automatically compensates for sensing circuit zero drift due primarily to individual circuit element changes with time, temperature, etc. By alternately turning the drive off and on while reading the ADC channels on and averaging several readings, the running average becomes the reference point.

The DAC 128 provides two important functions in this alternative embodiment 100. The DAC 128 provides a dithering function signal to both x and y channels via the fluxgate compass operational amplifiers 178a–d into the ADC 122 and also a dithering function signal to the tilt sensor output amplifier 136 to increase the resolution of these sensors. More specifically, DAC 128 output DACC is connected through a resistor 186 to a common connection point 188 between resistors 190 and 192. This common point 188 is also connected to ground via a resistor 194 and thus resistor 194 and 186 form a voltage divider network for the dither input. The other side of resistor 190 from the common point 188 is connected to the negative input of operational amplifier 178b. The other side of resistor 192 is connected to the negative input of operational amplifier 178d. In this manner, DAC 128 output DACC, the dithering function signal, is thus divided and fed equally to the x component differential amplifiers 178a and 178b and the y component differential amplifiers 178c and 178d.

The dithering function provided by the DACC output operates on the output of the operational amplifiers 120 during both the sampling period and the non sampling or zero compensation period and introduces a predetermined oscillation of small amplitude into the x and y component channels through resistors 190 and 192 which are high resistances, on the order of 1 MΩ. Thus the dithering signal is much lower than the x or y channel signals. The dithering oscillations basically introduce sub-bit steps to both the zero compensation period measurement and the compass signal measurement period input to the ADC 122 so that the resultant count will vary slightly and the total counts, when averaged together, produce a finer resolution than would be the case merely using a fixed current to get the same count value. Thus every time you take a sample you bump up the kind of offset into the operational amplifiers by a fraction of a bit. For example, a typical sample rate is 50 samples taken every tenth of a second. Thus every 2 milliseconds, the input to the ADC is incremented by $\frac{1}{12}$ bit dither so that every 50 samples the dither changes by about 4 bits. The dither function signal provides these sub bit increments of offset into the ADC 122 from the amplifiers 120. This sub bit incremental changing of the input to the ADC effectively increases the sensitivity of the overall instrument. Conversely, if the dither function were absent, sampling at 2 milliseconds you would only see one value into the ADC 122 during that period. Consequently, introducing the dither function into the operational amplifier output to the ADC 122 increases the overall system resolution, without adversely affecting the sensitivity or response of the compass.

The other function of the DAC 128 is to provide an overall offset or correction to the x and y components fed to the ADC 122 which compensates for local magnetic field distortions that can arise when the instrument is located in a motor vehicle or other structure that can otherwise skew the detected x and y components of the earth's magnetic field. These distortions could cause the ADC 122 to have to operate outside its normal band or operating region, perhaps even causing the ADC 122 signal to go into saturation. Therefore compensation is desirable to ensure its operation in its most accurate region.

Offset compensation for vehicular mounting of the instrument such as when it is mounted in a vehicle window, for example, involves moving the vehicle in a tight circle and taking measurements at predetermined directions around the circle such as every 90 degrees. The bearing is fed into the microprocessor 112 and a measurement of the sensed bearing is taken. This process is repeated around the circle. The software in the microprocessor 112 then computes the difference between the known directions and the measured direction x and y components and computes an average correction or offset voltage signal to compensate for the presence of the vehicle. This offset voltage signal is then fed by the DAC 128 to the operational amplifiers 178$a$–$d$ during normal instrument operation to recenter the operational amplifier output such that the inputs A1 and A2 to the ADC 122 will remain within the optimum operating region of the ADC.

The offset output DACA of DAC 128 is fed through a resistor 196 directly to the negative input of operational amplifier 178$b$. The offset output DACB of DAC 128 is similarly fed through a resistor 198 to the negative input of the operational amplifier 178$d$. DACA is also connected to ground by resistor 200. Similarly, DACB is connected to ground by resistor 202. The offsets provided by DACA and DACB are independently determined during calibration by the microprocessor 112 and essentially shift the operating range of the x and y amplifiers independently either up or down to optimize the region of operation of the 12 bit ADC 122 and thus re-zero instrument operation depending on the x and y components of the distorting effect of the vehicle.

In the embodiment 100 shown in FIG. 4, the oscillator 116 may be a TLC556C device. The square wave generator 152 and frequency divider 154 are portions of a 74AC74-SO flip flop device. The anti-phase switches 156$a,b,c,d$ are portions of a 4066-SO package device. The ADC 122 is a TLC2543-PLCC 12 bit device and the microprocessor 112 is a combination of an 87C51FB-PLCC device and an 88C681CJ-PLCC device. Fluxgate drive resistors 34 are typically 100Ω. Filter resistors 170 and 172 are typically 18 KΩ and filter capacitors 174 and 176 are typically 22 nf. Resistors 180$a,c$ and 180$b,d$ are typically 100 KΩ and 10 KΩ respectively. Resistors 196 and 198 are 100 KΩ. Resistors 200, 202, 182, 184, and 186 are typically 10 KΩ and resistors 190 and 192 are typically 1 MΩ. Each of these component values may change and are only meant to be exemplary of one embodiment of the invention.

While there have been described above the principles of the present invention in conjunction with specific circuitry techniques, it is to be clearly understood that the foregoing description is made only by way of example and not as a limitation to the scope of the invention. For example, the dual control sensitivity selection circuit 110 described above with reference to the alternative embodiment 100 may be replaced by a variable sensitivity control circuit or one which has a larger number of sensitivity choices. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

What is claimed is:

1. A self calibration method of zero compensation for a fluxgate compass, said fluxgate compass having a ferromagnetic core, a drive coil positioned around the core and at least two secondary sensing coils spaced around portions of said core, said method comprising the steps of:

generating and passing a drive signal through the drive coil for a first period of time, the drive signal selected to alternately drive the core into saturation in a first direction and drive the core into saturation in a direction opposite the first direction;

sensing a first sensor signal using at least one of the secondary sensing coils, where the first sensor signal includes a first portion sensed while the core is saturated in the first direction and a second portion sensed while the core is saturated in the opposite direction;

sensing a second sensor signal during a second period of time from at least one of said sensing coils while the drive signal is removed; and using said second sensor signal to determine a zero reference; and determining a magnitude of said first sensor signal using the first and second portions of the first signal and the zero reference.

2. The method according to claim 1 wherein said steps of sensing are continuous through both said first and second periods of time.

3. The method according to claim 1 wherein said step of generating is performed by a microprocessor.

4. The method according to claim 3 wherein the step of sensing a first sensor signal comprises sensing a first sensor signal during said first period of time from both of said sensing coils.

5. The method according to claim 4 wherein the step of sensing the second signal further comprises sensing said second sensor signal from both of said sensing coils.

6. The method according to claim 1 wherein said first and second periods of time are equal in length.

7. The method of claim 1 wherein said step of using further comprises the steps of:

separately demodulating said first and second portions of said first sensor signal;

demodulating said second sensor signal;

converting said demodulated signals to digital signals; and transmitting said digital signals to a microprocessor.

8. The method of claim 7 wherein said step of sensing the second sensor signal uses the at least two secondary sensing coils spaced orthogonally to each other.

9. The method of claim 8 wherein said steps of sensing are substantially continuous.

10. The method of claim 9 wherein said first and second periods of time are equal in length.

11. The method according to claim 7 wherein said step of using further comprises the step of applying a dither function signal to said demodulated signals.

12. The method of claim 11 wherein said dither function signal is applied to said demodulated signals during both said first and said second periods of time.

13. A self calibrating zero compensation circuit for a compass sensor wherein the sensor comprises a ferromagnetic core, a drive coil around the core, and at least two secondary sensing coils around separate portions of said core, said circuit comprising:

an oscillator operably connected to a square wave generator;

a microprocessor to generate a drive signal coupled to said drive coil to drive said drive coil into saturation in a first direction and into saturation in a second direction opposite the first direction during a first period of time, said microprocessor capable of removing said drive signal from said drive coil during a second period of time, said microprocessor adapted to receive and use an output signal from said secondary sensing coils during said second period of time to determine a zero reference, said microprocessor capable of processing said output signal from said secondary sensing coils received during said first period of time with the zero reference;

a demodulator adapted to be connected to each of said secondary coils and operably connected to said square wave generator, said demodulator having at least one anti-phase switch capable of demodulating the output signal from said secondary sensing coils generated from the positive saturation drive signal and capable of separately demodulating the output signal from said secondary sensing coils generated from the negative saturation drive signal, said demodulator providing an output signal to said microprocessor.

14. The circuit according to claim 13 wherein said demodulator output signal is sent through an amplifier and an analog to digital converter and then to said microprocessor.

15. The circuit according to claim 13 wherein said demodulator is adapted to separately receive sensing signals from said at least two sensing coils as x and y component signals.

16. The circuit according to claim 15 wherein said square wave generator is connected to a clock input of a frequency divider whose output is connected to said drive coil, said divider frequency being controlled by said microprocessor.

17. The circuit according to claim 16 wherein said at least one anti-phase switch comprises four anti-phase switches and said square wave generator has a positive output and a negative output each connected to two of the four demodulator anti-phase switches.

18. The circuit according to claim 17 wherein one of said secondary coils generating said x component signal is connected to one of said anti-phase switches with a square wave generator positive output and is connected to another one of said anti-phase switches with a square wave generator negative output.

19. The circuit according to claim 13 wherein said first and second time periods are equal.

20. The circuit according to claim 19 wherein said drive coil signal is a square wave having a frequency equal to half the output of said square wave generator.

21. The circuit according to claim 13 wherein said demodulator output signal includes a dither function signal.

22. The circuit according to claim 21 wherein said dither function signal is applied to said demodulator output signal during both said first and said second periods of time.

23. The circuit of claim 13 wherein said microprocessor is adapted to apply a dither function signal to said demodulator circuit output signal during both said first and said second periods of time.

* * * * *